United States Patent [19]

Horiguchi et al.

[11] Patent Number: 4,921,537
[45] Date of Patent: May 1, 1990

[54] SHRINKAGE COMPENSATED MORTAR MATERIAL

[75] Inventors: Kazuo Horiguchi, Hiratsuka; Kazuyoshi Hosaka, Chigasaki; Akira Yoshizumi, Kanagawa, all of Japan

[73] Assignee: Sandoz Ltd., Basel, Switzerland

[21] Appl. No.: 601,832

[22] Filed: Apr. 19, 1984

[30] Foreign Application Priority Data

May 14, 1983 [JP] Japan ................................. 58-84692

[51] Int. Cl.$^5$ ............................ C04B 7/02; C04B 7/19
[52] U.S. Cl. ........................................ 106/90; 106/89; 106/118; 106/119; 106/120
[58] Field of Search ................... 106/90, 314, 98, 315, 106/120, 119, 118, 894

[56] References Cited

U.S. PATENT DOCUMENTS

| | | | |
|---|---|---|---|
| 2,892,728 | 6/1959 | Jolly | 106/90 |
| 3,973,978 | 8/1976 | Nakagawa et al. | 106/95 |
| 4,012,264 | 3/1977 | Murray et al. | 106/89 |
| 4,046,583 | 9/1977 | Collepardi | 106/90 |
| 4,057,608 | 11/1977 | Hashimoto et al. | 106/88 |
| 4,060,425 | 11/1977 | Harada | 106/90 |
| 4,082,561 | 4/1978 | Nakagawa et al. | 106/89 |
| 4,125,410 | 11/1978 | Natsuume | 106/90 |
| 4,316,583 | 2/1982 | Kawano et al. | 241/1 |
| 4,350,533 | 9/1982 | Galer et al. | 106/89 |
| 4,477,284 | 10/1984 | Isogai et al. | 106/104 |

FOREIGN PATENT DOCUMENTS

| | | | |
|---|---|---|---|
| 54-154425 | 12/1979 | Japan | 501/119 |
| 57-135747 | 8/1982 | Japan | 106/89 |

Primary Examiner—William R. Dixon, Jr.
Assistant Examiner—Paul Marcantoni
Attorney, Agent, or Firm—Gerald D. Sharkin; Robert S. Honor; Walter F. Jewell

[57] ABSTRACT

A shrinkage compensated mortar or grout can be made with about 40 to 60% by weight of fine aggregate and 40 to 60% by weight of a hydraulic composition which in turn is made with 60 to 80% by weight of mixture of rapid hardening cement and 20 to 40% portland cement; and based on the weight of cement, 5 to 8% by weight of silica powder; 0.2 to 0.4% by weight of a hydroxycarboxylic acid or a salt thereof; and 2 to 3% by weight of a high performance water-reducer. Such shrinkage compensated mortars or grouts are useful in the installation of machinery, foundations for major structures and the like.

3 Claims, No Drawings

SHRINKAGE COMPENSATED MORTAR MATERIAL

CROSS REFERENCE TO RELATED APPLICATION

This application claims foreign priority based on Japanese Patent Application No. 58-84692, filed May 14, 1983.

BACKGROUND OF THE INVENTION

This invention is concerned with a mortar material composed of all materials, except water, of which the mortar is composed. The desired mortar may be produced by adding water to the referenced mortar material.

During installation of machinery, the installation of foundations for bridges, or during the installation of inverse castings of concrete, an opening is temporarily formed between the structures, and mortar (also called grout) is later poured into the referenced opening. The referenced mortar should have high flowability in order to fill the void completely. In addition, it is critical that there be no shrinkage. If the mortar shrinks at the time of hardening, adhesion between the hardened mortar and the structure will not occur. Moreover, the referenced mortar must be able to withstand the conditions of use.

Utility of cement products such as mortar and concrete is usually evaluated by means of 28-day strength tests. The referenced mortar is also evaluated by 28-day strength tests. However, the use of mortar as referenced is merely one of the procedures of the total construction process. If the mortar does not harden to certain standards of strength, the next stage of construction cannot be started. The strength required of the mortar differs depending upon the type of work and processes involved. However, in general the mortar of this invention attains adequate strength within 2 or 3 days at normal temperatures. During the winter additional time is required. Consequently, there is a problem of waiting before the next step in construction can be commenced.

If a shrinkage compensated, fast hardening mortar which achieves compressive strength of 100 to 150 kg/cm$^2$ within a few hours of placement could be produced, it could reduce the total construction time. However, there has been no mortar with both accelerated hardening characteristics and characteristics of strength and durability, while at the same time providing practicality and total balance in terms of high flowability, shrinkage compensation, high strength, accelerated time of set, and early utility. For example, normal mortars with accelerated setting time hardening characteristics are often deficient in 28-day strength, creating an imbalance of the desired characteristics, resulting in a lack of utility of the product.

SUMMARY OF THE INVENTION

The purpose of this invention is to produce a better and more practical shrinkage compensated mortar which has both accelerated hardening characteristics and good strength characteristics. A wide range of experiments were performed with the material components of the referenced mortar, with the ratios of the component materials used, and with the performance of the mortar. The result was the discovery of components which achieved the objectives of this invention.

The composition of the shrinkage compensated mortar used by this invention is as follows:
a. Cement composed of 60 to 80% by weight of fast hardening cement, and the balance of portland cement;
b. Lime 5 to 8% by weight;
c. Silica Powder 5 to 8% by weight;
d. Hydroxylated carboxylic acid or the equivalent sodium salt 0.2 to 0.4% by weight;
e. Super plasticizing agent 2 to 3% by weight.

This material is characteristic of mortars in that it is composed of 40 to 60% by weight hydraulic material and 40 to 60% by weight of fine aggregate.

DETAILED DESCRIPTION OF THE INVENTION

The fast hardening cement of the above mentioned components is primarily portland cement produced, however, with bauxite or kaolin as the alumina source. In addition, fluosilicate is used as the source of fluorine. The components are calcined to produce the fast hardening component of the mortar material. The clinker is primarily made of solid solution of $3CaO \cdot SiO_2$, the solid solution of $11CaO \cdot 7Al_2O_3 \cdot CaF_2$, small amounts of the solid solution of $CaO \cdot SiO_2$, a solid solution of $2CaO \cdot Fe_2O_3 \cdot 6CaO \cdot 2Al_2O_3 \cdot Fe_2O_3$ and $CaO$. In addition, anhydrous gypsum is added to the ground clinker. This mixture is generally referred to as "Jet Cement". The shrinkage compensated mortar which contains this fast hardening cement has both fast hardening characteristics and good strength characteristics. However, the placement time is limited and 28-day strength is low. In order to overcome these shortcomings, this fast hardening cement and portland cement are blended in the above-mentioned proportions.

The lime expansion material is a baked clinker powder containing a large amount of $CaO$ crystal grains of which the primary components are the 3 components of $3CaO \cdot SiO_2, CaO, CaSO_4$. When water is added, $CaO$ hydrates to $Ca(OH)_2$ and expands. This component is added to the mortar in order to obtain shrinkage compensation characteristics. The amount added should be within the range given above. When the amount added is less than given, adequate shrinkage compensation characteristics cannot be obtained. On the other hand, if the amount added is too much, undesirable excessive expansion is obtained.

The silica powder in the formula reacts with the $Ca(OH)_2$ produced by the hydration of lime expansion material, and produces the crystalline calcium silicate. This compound is blended into the shrinkage compensating mortar in order to increase strength at later ages, and to control the expansion. Among the various silica powders, silica flour or silica fume, an extremely fine crystal of silica powder, with an average diameter less than 1 micron, seems to be the most suitable material to obtain the objectives of this invention. This extremely fine crystalline silica fume does not require as large an amount of water as some other types of silica powders in order to obtain the effects cited. Optimum results are obtained when the amount of the silica fume is the same as that of the lime expansive material.

The hydroxycarboxylic acid or sodium salt is used to remedy the problem of early setting times, caused by the use of the fast hardening cement. When the amount added is below the above cited range, its retarding effect is inadequate. On the other hand, when the amount added is greater than that of the range cited, there is a delay in the time required to achieve setting time and early strength characteristics. Gluconic acid or sodium gluconate produces the best results.

The referenced water reducing agent is a product possessing low air-entraining characteristics in concrete, with little or no retardation. This includes a sodium salt of a condensate of naphthalene sulfonic acid and formaldehyde, and a sodium salt of a condensate of sulfonated melamine and formaldehyde. The water reducing agent is added to the mix in order to reduce the amount of water necessary to produce an adequate degree of flowability in the shrinkage compensated mortar. As the amount of mixing water is reduced, the compressive strength is increased. At the same time "bleeding", which destroys some of the characteristics of shrinkage compensated mortars is controlled. In general, about 0.5% by weight of cement of this type of water reducing agent is used for ordinary concrete materials. However, in this invention, greater amounts of this agent are used. The exact amount of water reducing agent in the mortar is determined relative to the amounts of the other compounds needed to produce high flowability, high strength, and shrinkage compensation.

The mortar material of this invention is composed of 40 to 60% by weight of fine aggregate, as cited in sections (a) to (e). This fine aggregate should be hard and clean (such as with quartz sand or silica sand). The shape of the grains should be well formed, and able to pass through a 2.5 mm sieve. The aggregate should not contain too much fine sand. The range for the hydraulic material and the aggregate is appropriate for this use. When the amount of fine aggregate is reduced below the limits given, the characteristics of shrinkage compensation and working time are also reduced significantly.

Water is added to the mortar material of this invention and mixed well. This produces a mortar having the necessary characteristics of flowability. The required degree of flowability varies according to the shape of the space which should be filled, and the method of placing the mortar. However, flowability is standardized in "Test Methods for Quality Control of Non-Shrink Mortar" by the Japan Highway Corporation. Flowability is the flow time measured by the designated and improved J funnel, equivalent to $8+/-3$ seconds. The mortar material of this invention achieved high flowability, above the referenced $8+/-3$ seconds, by adding less than 40% by weight of water per 100% by weight of hydraulic material.

It takes about 3 hours at normal ambient temperatures of 22° C. to reach a compressive strength of 150 kg/cm$^2$. It takes about 7 hours at 5° C. Later 28-day strength is more than 600 kg/cm$^2$. Normal working time for the mortar is more than 15 minutes, and is practical. This invention has demonstrated for the first time a shrinkage compensated mortar with superior characteristics of an accelerated setting time, long term strength, and practical working time. Of course, desired characteristics of good flowability and shrinkage compensation are also present. In addition, it is appropriate often to add 0.5 to 1.5% by weight of sodium carbonate to the 100% by weight of the cement component in order to increase the fast setting characteristics.

In the manner of this invention, it is possible to reduce the period of time required for machinery installation by using the shrinkage compensating mortar composed of the materials specified. During the winter, in periods of low temperature, ordinary mortar does not gain strength quickly. For this reason any processes following the pouring of the mortar may be delayed for several days. However, the mortar described by this invention, as previously mentioned, achieves the designated strength at the low temperature of 5° C., although a few hours later than at ordinary temperatures. For this reason, construction time during the winter can be greatly reduced.

In addition, the mortar material of this invention can be used in a special way for installation of machinery. Prior to the installation of the base plate, the pads which support the base plate are usually constructed on a concrete base. The material used is different from the shrinkage compensating mortar. However, small amounts of water can be added to the mortar of this invention, producing a fairly dry mixture. Pads can be made of this mixture, by tamping it down.

EXAMPLES

The effects of the mortar material of this invention were tested as follows:
(1) The components of the mortar material of this invention were as follows:
  (a) Fast Hardening Cement (JC).
    Trademark "Jet Cement" manufactured by Onoda Cement Corporation.
  (b) Portland Cement (PC)
    Ordinary Portland Cement manufactured by Asano Cement Corporation.
  (c) Lime Expansion Material (EX)
    Trademark "Ekusupsan" manufactured by Onoda Cement Corporation.
  (d) Silica Powder (SI)
    Silica powder commercially marketed. Average grain diameter is 0.2 to 0.5 microns, and SiO$_2$ content is 90.40% by weight or greater
  (e) Sodium salt of hydroxycarboxylic acid
    Sodium Gluconic Acid
  (f) Water-reducing agent
    Formaldehyde condensate of sulfonated melamine, sodium salt (SMF). Trademark "Merumento F-10" manufactured by Showa Denko Corporation.
  (g) Fine Aggregate
    Quartz sand under 2.5 mm.
(2) Composition of This Invention
  (a) The composition of this invention is as shown in the following Table:

| Cement % by Weight | | % by Weight for 100% Cement Component | | | |
| --- | --- | --- | --- | --- | --- |
| JC | PC | EX | SI | GA | SMF |
| 70 | 30 | 6 | 6 | 0.3 | 2.7 |

(b) Composition of Mortar Materials
    The shrinkage compensated mortar is made by mixing 50% by weight of the hydraulic material and 50% by weight of the fine aggregate.
(3) Mortar Produced by This Invention
  The mortar produced by this invention is made by adding 18.8% by weight (unspecified) to 100% by weight of the above cited mortar material. The temperature was set at 19° C., and the improved J funnel flow time is 5.7 seconds.* In addition, the usable time for this mortar is 15 minutes.

*Note: The J funnel is a funnel shaped cylinder, with an inside diameter at the upper edge of 70 mm, and an inside diameter at the lower edge of 14 mm, with a height of 395 mm. The mortar is filled to the upper surface of the improved J funnel. The lower opening is closed with a finger while the mortar is filled. When filled completely, the finger is removed to permit the mortar to flow out. The time required for the mortar to flow out is measured by a stop watch. This time is referred to as the "flow rate".

(4) Comparison with Other Mortars

The required amount of water was added to commercially available calcium sulfoaluminate (CSA) mortar. At a temperature of 21° C. the flow rate was 6.2 seconds.

(5) Experimental Results

Table 1 shows the experimental results obtained at three different temperatures, i.e. 5° C., 20° C. and 30° C. respectively. No bleeding was observed in any of the test specimens. As seen in Table 1, the mortar made with the material of this invention produced a strength of more than 150 kg/cm$^2$ within several hours. It showed accelerated hardening characteristics. At the same time, the 28-day compressive strength tests showed more strength than other products. It is clear that the mortar of this invention has characteristics superior to others.

In addition, with the exception of when the hydraulic material, to which 1 percent of sodium carbonate was added to 100% by weight of cement components, was used and added to the component structure of our invention, as shown in section (2)(a), the mortar of the same mixing components as this invention showed about 10 percent greater initial strength than that of the mortar of this invention, as shown in the above chart.

TABLE 1

| | Temperature used. (C) | Expansion Ratio (%) | | | Compression Strength (Kg/cm$^2$) | | | | | | |
|---|---|---|---|---|---|---|---|---|---|---|---|
| | | Day 1 | Day 7 | Day 28 | 3 hr | 6 hr | 12 hr | Day 1 | Day 3 | Day 7 | Day 28 |
| Products from this Invention | 5 | +0.129 | +0.129 | +0.129 | 61 | 144 | 195 | 280 | 410 | 547 | 677 |
| | 20 | +0.168 | +0.168 | +0.168 | 155 | 216 | 297 | 446 | 579 | 645 | 716 |
| | 30 | +0.175 | +0.175 | +0.175 | 160 | 244 | 362 | 522 | 634 | 691 | 722 |
| Compared Products | 5 | +0.080 | +0.010 | +0.010 | — | — | — | 14 | 253 | 480 | 619 |
| | 20 | +0.014 | +0.014 | +0.014 | — | — | — | 212 | 397 | 545 | 649 |
| | 30 | +0.015 | +0.015 | +0.015 | — | — | — | 396 | 430 | 576 | 664 |

What is claimed is:

1. A shrinkage compensated mortar having about 40 to 60% by weight of fine aggregate and correspondingly 40 to 60% by weight of hydraulic mixture composition consisting of: 60 to 80% by weight of rapid hardening cement and correspondingly 20 to 40% by weight of portland cement; and, based on the weight of the hydraulic mixture composition, 5 to 8% by weight of lime-based expanding material comprising baked lime clinker powder comprising CaO crystal grains predominantly composed of the three components $3CaO.SiO_2$, CaO and $CaSO_4$; 5 to 8% by weight of silica powder; 0.2 to 0.4% by weight of hydroxycarboxylic acid or a salt thereof: and 2 to 3% by weight of a high performance water reducer comprising formaldehyde condensate of sulfonated melamine, sodium salt.

2. A shrinkage compensated mortar in accordance with claim 1 wherein the hydroxycarboxylic acid is the sodium salt of hydroxycarboxylic acid.

3. A shrinkage compensated mortar in accordance with claim 1 wherein the hydroxycarboxylic acid is sodium gluconic acid.

* * * * *